No. 886,689. PATENTED MAY 5, 1908.
B. H. ELLIS.
RAKE.
APPLICATION FILED FEB. 18, 1907.
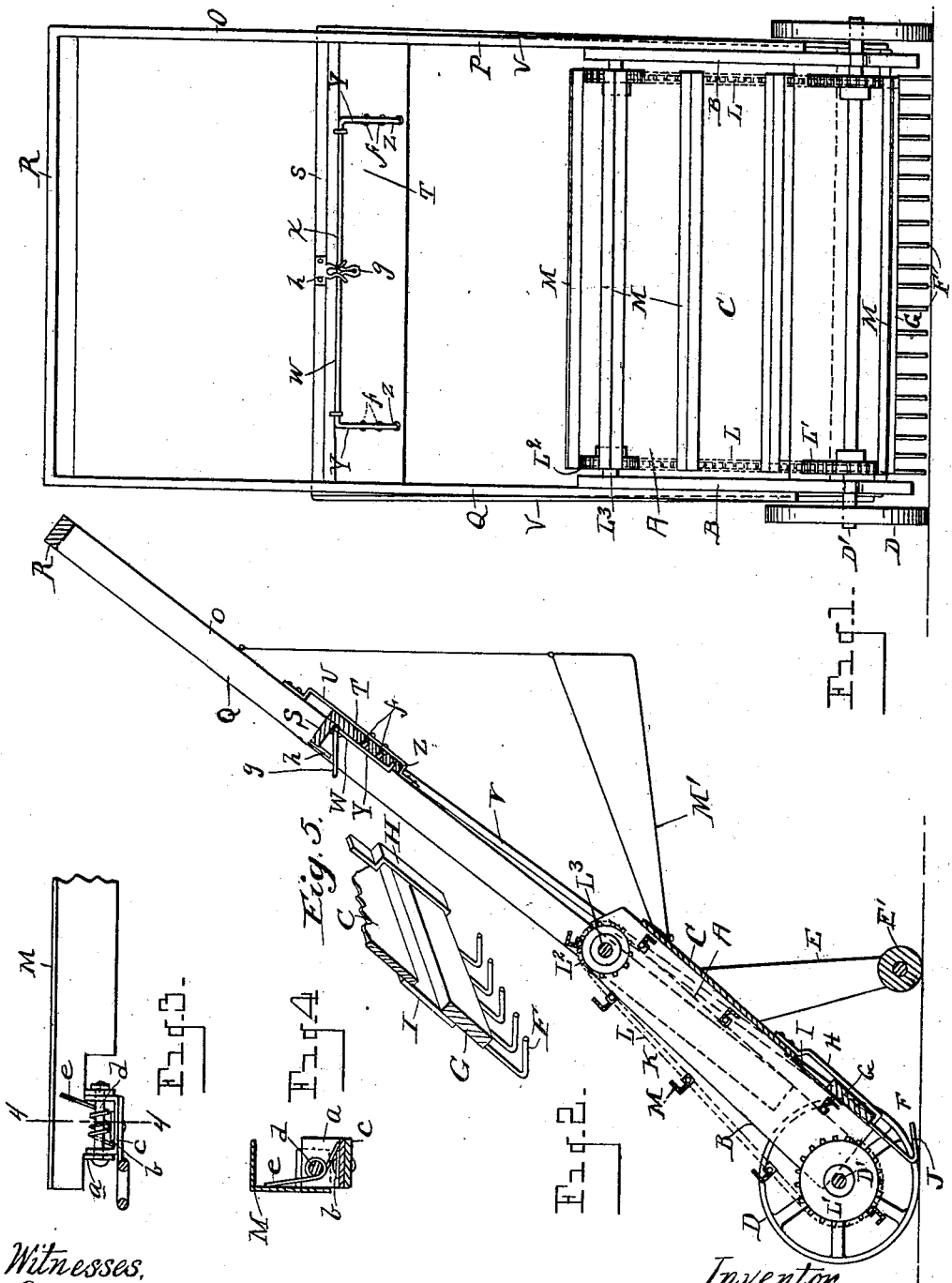
Witnesses.
O. B. Baenziger
Amelia Williams
Inventor.
Benjamin H. Ellis
By Whittemore, Hulbert & Whittemore
Attys.

UNITED STATES PATENT OFFICE.

BENJAMIN H. ELLIS, OF DETROIT, MICHIGAN, ASSIGNOR OF ONE-HALF TO WILLIAM J. MERDIAN, OF DETROIT, MICHIGAN.

RAKE.

No. 886,689.     Specification of Letters Patent.     Patented May 5, 1908.

Application filed February 18, 1907. Serial No. 358,043.

*To all whom it may concern:*

Be it known that I, BENJAMIN H. ELLIS, a citizen of the United States of America, residing at Detroit, in the county of Wayne and State of Michigan, have invented certain new and useful Improvements in Rakes, of which the following is a specification, reference being had therein to the accompanying drawings.

The invention relates to a rake of the character wherein means are provided for conveying the collected material from the rake teeth to a suitable receptacle in which the material may be deposited, and it consists in the novel and simple construction of rake, and in the peculiar arrangement and combination of its parts.

In the drawings,—Figure 1 is a front elevation of a rake embodying my invention; Fig. 2 is a vertical longitudinal section therethrough; Fig. 3 is a plan view, illustrating a yielding connection between the carrier blades and their support; and Fig. 4 is a section taken on lines 1—1 of Fig. 3. Fig. 5 is a detached perspective view, illustrating the construction and arrangement of the tooth-carrying bar and bridging member.

In construction, the rake is composed of a main or body section, A, consisting of suitable sides B and a bottom plate C.

D are supporting wheels for the body at its lower end, secured upon a transverse shaft D' journaled in the body sides, and E is a supporting frame carrying a transverse roller E' depending from the upper rear portion of the body, and adapted to hold the latter in an upwardly inclined position, as indicated in Fig. 2.

F represents a series of rake teeth attached to a transverse bar G, mounted in guides H upon the lower portion of the body for longitudinal sliding movement, and I is a plate adapted to be secured either to the body or the sliding bar G, and in this instance is shown as attached to the latter bar, the plate extending upwardly to and over the bottom plate, forming a bridging member to cover the space between the parts. To prevent the teeth from digging into the ground during the operation of the rake, the ends are return-bent, as shown in Fig. 2, the rearwardly-extending portions J being preferably parallel with and contacting with the ground in the normal position of the parts.

For conveying the material away from the rake teeth, a carrier K is provided, consisting of chains,—preferably of the sprocket type,— L, sprocket wheels L' fixedly secured to the shaft D', and similar sprocket wheels L² upon a transverse shaft L³ journaled in the upper end portions of the body sides, as shown in Fig. 2. The carrier is provided with transverse blades M, preferably angle-shaped in form, and so arranged and apportioned as to bear against the bottom section during their upward movement to convey the material along the bottom and discharge the same over its upper edge into a suitable receptacle M' secured to the body.

To prevent breakage of parts, in the event that stones or similar articles are picked up by the rake, I form a yielding connection between each of the carrier blades and the supporting chain, which permits the blade when encountering the obstacle to yield sufficiently to pass over it. The yielding connection is preferably in the form of a spring backing, as shown in Figs. 3 and 4, formed of spaced ears $a$ struck up from the end portions of each carrier blade, and boxes of U-shaped construction $b$, secured in any suitable manner to a lug $c$ carried by the chain, a bolt $d$ extending through the box and the blade ears, and a spring $e$ encircling the pivot bolt, its ends arranged to bear respectively against the blade and the box, thus forming the yielding abutment referred to.

O represents a suitable handle section for the rake to permit of its operation, consisting in this instance of side bars P and Q fixedly secured to the body sides, and a cross bar R at their upper ends forming a handle proper.

It is frequently necessary to vary the distance between the rake teeth and the ground, and for this purpose I have provided an adjusting mechanism adapted to be conveniently actuated by the operator in using the rake, for shifting the teeth longitudinally of the body for the purpose set forth, and provide further means for holding the teeth in their different positions of adjustment. The mechanism employed consists of a cross bar S fixed to the handle sections, a similar longitudinally-adjustable bar T mounted in guides U upon the handles for longitudinal movement, connecting rods V joining the movable bar T and the adjustable tooth-carrying bar G, and a locking mechanism W. The latter means consist preferably of a lever pivoted upon the cross bar S, having forwardly-extending arms Y, carrying depending end portions Z, adapted to engage an oppositely-disposed pair of openings *f* formed in the adjustable bar T, as shown in Fig. 1. The lever is provided with an operating section *g* for lifting its engaging portions out of the openings in the bar T, to permit of the adjustment of the teeth, and a clip *h* on the bar S is provided for receiving the handle section, and holding the lever out of engagement with the bar T when desired.

Upon movement of the rake along the ground, the material is collected by the rake teeth, and the carrier, actuated by the supporting wheels, conveys the material along the body and deposits it into the receptacle. The series of teeth are varied in their relation to the ground by the shifting of the transverse bars through the agency of the operating lever, and are held in any desired position in relation to the ground by engaging the lever ends in the apertures in the movable bar T.

What I claim as my invention is,—

1. In a hand-rake, the combination with an upwardly-extending rearwardly-inclined body section, of supporting wheels for said body at the lower forward end thereof, a supporting frame for and depending from the body, and a transverse roller journaled in said frame, rake teeth carried by the body, and a handle section at the rear of said body.

2. In a rake, the combination with an upwardly-extending rearwardly-inclined body section, of supporting wheels therefor, a series of rake teeth carried by the body at its lower forward end and adjustable longitudinally of the body, and a handle section for and extending rearwardly from the body.

3. In a rake, the combination with an upwardly-extending rearwardly-inclined body section, of supporting wheels therefor, a series of longitudinally adjustable teeth at the lower end of the body extending forwardly therefrom in substantially the plane of said body, means for adjusting the teeth, and a handle section for and extending rearwardly of the body.

4. In a rake, the combination with an upwardly-extending rearwardly-inclined body section, and a series of rake teeth along the lower edge of the body extending forwardly therefrom in substantially the plane of said body, the teeth ends being return-bent extending rearwardly at an acute angle to the body in a position to slide upon the ground.

5. In a rake, the combination with a body, of a tooth-carrying bar having a sliding engagement therewith, a handle section for the body, a longitudinally-adjustable member upon the handle section, and an operative connection between the former and the tooth-supporting bar.

6. In a rake, the combination with a rearwardly-inclined body section, of a tooth-carrying section at the lower end and adjustable longitudinally of the body, and a bridging member carried by one of the sections and acting to bridge the space between said sections.

7. In a rake, the combination with a body, of an adjustable tooth-carrying bar forming a continuation of the body at its forward end, and a plate extending over the bar and body and bridging the space between.

8. In a rake, the combination with an upwardly-inclined body section, of supporting wheels therefor, a handle section for the body, a transverse bar mounted upon the handle section for longitudinal adjustment, a tooth-carrying bar similarly mounted upon the body at its lower end, connecting rods joining the bars, and means for retaining the bars in their various positions of adjustment.

9. In a hand-rake, the combination with an upwardly-extending rearwardly-inclined body section, of a tooth-carrying bar at the lower edge and in substantially the plane of the body arranged for longitudinal adjustment, a series of rake teeth upon the bar, and means for adjusting said bar.

In testimony whereof I affix my signature in presence of two witnesses.

BENJAMIN H. ELLIS.

Witnesses:
JAMES P. BARRY,
NELLIE KINSELLA